United States Patent
Perera et al.

(10) Patent No.: US 11,563,253 B1
(45) Date of Patent: Jan. 24, 2023

(54) METHOD AND SYSTEM FOR FORMATION OF CYLINDRICAL AND PRISMATIC CAN CELLS

(71) Applicant: Enevate Corporation, Irvine, CA (US)

(72) Inventors: Sanjaya D. Perera, Irvine, CA (US); Benjamin Park, Irvine, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

(21) Appl. No.: 17/377,029

(22) Filed: Jul. 15, 2021

(51) Int. Cl.
  *H01M 50/224* (2021.01)
  *H01M 10/0565* (2010.01)
  *H01M 50/494* (2021.01)
  *H01M 10/04* (2006.01)
  *H01M 50/231* (2021.01)
  *H01M 4/134* (2010.01)

(52) U.S. Cl.
  CPC ......... *H01M 50/224* (2021.01); *H01M 4/134* (2013.01); *H01M 10/0422* (2013.01); *H01M 10/0565* (2013.01); *H01M 50/231* (2021.01); *H01M 50/494* (2021.01)

(58) Field of Classification Search
  None
  See application file for complete search history.

(56) References Cited

U.S. PATENT DOCUMENTS

| | | | |
|---|---|---|---|
| 2011/0104532 A1 | 5/2011 | Buck et al. | |
| 2014/0266066 A1* | 9/2014 | Turon Teixidor | H01M 10/446 320/137 |
| 2014/0315097 A1* | 10/2014 | Tan | H01M 4/387 429/300 |
| 2015/0372290 A1* | 12/2015 | Li | H01M 10/058 429/188 |
| 2018/0269524 A1* | 9/2018 | Haufe | H01M 4/386 |
| 2018/0342761 A1 | 11/2018 | Eaglesham et al. | |
| 2019/0326562 A1 | 10/2019 | Ota et al. | |
| 2019/0341585 A1 | 11/2019 | Shi et al. | |
| 2019/0341647 A1* | 11/2019 | Woo | H01M 4/382 |
| 2019/0372148 A1* | 12/2019 | He | H01M 10/052 |
| 2019/0386296 A1 | 12/2019 | He et al. | |
| 2021/0104737 A1 | 4/2021 | Teng et al. | |
| 2021/0151839 A1 | 5/2021 | Niedzwiecki et al. | |

OTHER PUBLICATIONS

Int'l Search Report and Written Opinion Appln No. PCT/US2022/031794 dated Oct. 6, 2022.

* cited by examiner

*Primary Examiner* — Eli S Mekhlin
(74) *Attorney, Agent, or Firm* — McAndrews Held & Malloy, Ltd.

(57) ABSTRACT

A method for formation of cylindrical and prismatic can cells may include providing a battery, where the battery includes one or more cells, with each cell including at least one silicon-dominant anode, a cathode, and a separator. The battery also includes a metal can that contains the one or more cells such that during formation a pressure between 50 kPa and 1 MPa is applied to the one or more cells. The battery may include strain absorbing materials arranged between the one or more cells and interior walls of the can. The strain absorbing materials may include foam. The strain absorbing materials may include a solid electrolyte layer. The strain absorbing materials may include PMMA, PVDF, or a combination thereof. The pressure during a formation process may be due to a thickness of the strain absorbing materials being thicker than an expansion of the one or more cells.

24 Claims, 9 Drawing Sheets

METHOD AND SYSTEM FOR FORMATION OF CYLINDRICAL AND PRISMATIC CAN CELLS

CROSS-REFERENCE TO RELATED APPLICATIONS/INCORPORATION BY REFERENCE

N/A

FIELD

Aspects of the present disclosure relate to energy generation and storage. More specifically, certain embodiments of the disclosure relate to a method and system for formation of cylindrical and prismatic can cells.

BACKGROUND

Conventional approaches for formation of can cells may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for formation of cylindrical and prismatic can cells, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
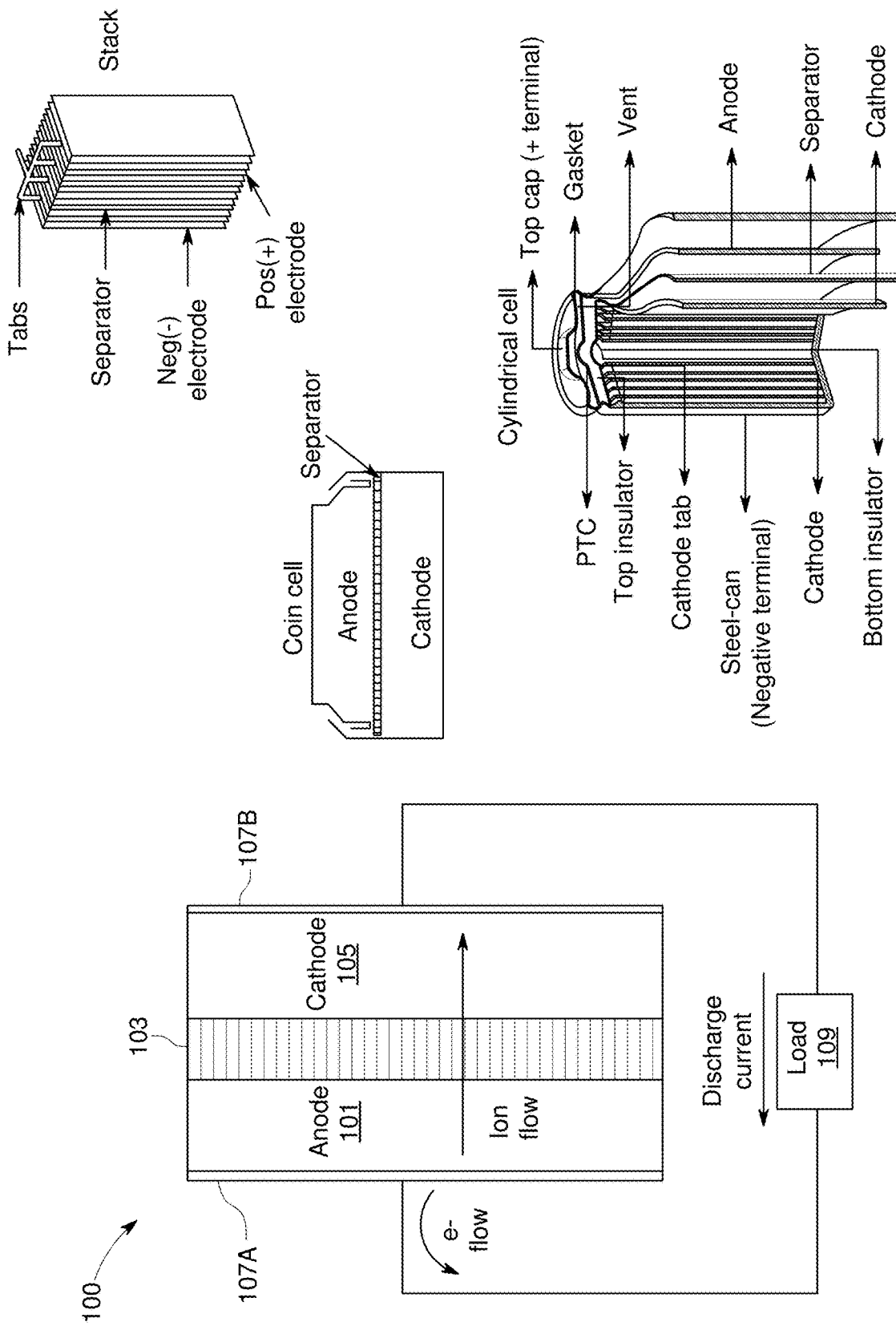
FIG. 1 is a diagram of a battery, in accordance with an example embodiment of the disclosure.

FIG. 1 is a diagram of a battery with silicon-dominant anodes, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack. Furthermore, the battery 100 shown in FIG. 1 is a very simplified example merely to show the principle of operation of a lithium ion cell. Examples of realistic structures are shown to the right in FIG. 1, where stacks of electrodes and separators are utilized, with electrode coatings typically on both sides of the current collectors. The stacks may be formed into different shapes, such as a coin cell, cylindrical cell, or prismatic cell, for example.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. In an example scenario, the electrolyte may comprise Lithium hexafluorophosphate ($LiPF_6$) and lithium bis(trifluoromethanesulfonyl)imide (LiTFSI) that may be used together in a variety of electrolyte solvents. Lithium hexafluorophosphate ($LiPF_6$) may be present at a concentration of about 0.1 to 2.0 molar (M) and lithium bis(trifluoromethanesulfonyl)imide (LiTFSI) may be present at a concentration of about 0 to 2.0 molar (M). Solvents may comprise one or more of ethylene carbonate (EC), fluoroethylene carbonate (FEC) and/or ethyl methyl carbonate (EMC) in various percentages. In some embodiments, the electrolyte solvents may comprise one or more of EC from about 0-40%, FEC from about 2-40% and/or EMC from about 50-70%. The electrolyte can also be a polymer or polymer gel type electrolyte, which includes solid polymer and gel polymer electrolytes (GPE) where a gelling agent is added to a liquid electrolyte. GPEs consist of liquid electrolyte absorbed within a polymer matrix. Examples of polymer matrix are poly(vinylidene difluoride) (PVdF), poly(ethylene oxide) (PEO), poly(methyl methacrylate) (PMMA), polyvinyl chloride (PVC), and poly(vinylidene fluoride-hexafluoropropylene). Polymer groups such as (but not limited to) polyacrylate, polynitrile, polyether, polycarbonate polyvinyl can be considered as other polymer hosts for GPEs.

Inorganic solid electrolytes (ISE), solid polymer electrolytes (SPE), and composite electrolytes (CSE) can also be employed. SPEs with inert oxide ceramic as fillers such as $SiO_2$, $Al_2O_3$, $TiO_2$, zeolite are some examples that can been incorporated into a polymer. Garnet-type $(A_3B_2(XO_4)_3$ (A=Ca, Mg, Y, La or rare-earth elements; B=Al, Fe, Ga, Ge, Mn, Ni, or V), Perovskite-type solid electrolytes, NASICON-type and LISICON-type SPEs can also be introduced as fast ionic conductors.

The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon or more by weight in the anode material on the current collector, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (4200 mAh/g vs. 372 mAh/g for graphite) and volumetric capacities (2194 mAh/L vs. 890 mAh/L for graphite). In addition, silicon-based anodes have a low lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

In this disclosure, prismatic and cylindrical can cells are described where the expansion of the electrodes during formation and cycling is known, and strain absorbing layers may be incorporated in the cans to configure a desired pressure. The formation process comprises at least one charge/discharge cycle. The current may be greater than 1C, greater than 2C, greater than 3C, or greater than 4C, for example, to reduce the formation time. Sizing of the internal stack of electrodes/separator may be configured so that the electrodes expand just enough to apply the right range of pressure on the stack. In addition, applying pressure or just placing the can cell in a constant gap metal plate system so that the metal can does not bulge during formation or during cycling may also provide desired formation pressures while reducing/eliminating can bulging during operation. Having a foam or other "springy" material within the can cell may ensure pressure uniformity. The foam may comprise a foam that is robust to electrolyte and stable at elevated temperatures that is suitable for high temperature cell operation. In another example scenario, an excess separator or multiple layers of separator may be utilized to provide this interface, or springy material. An inert filler material may also be used such as alumina, silica, or zirconia.

Figure 2A:
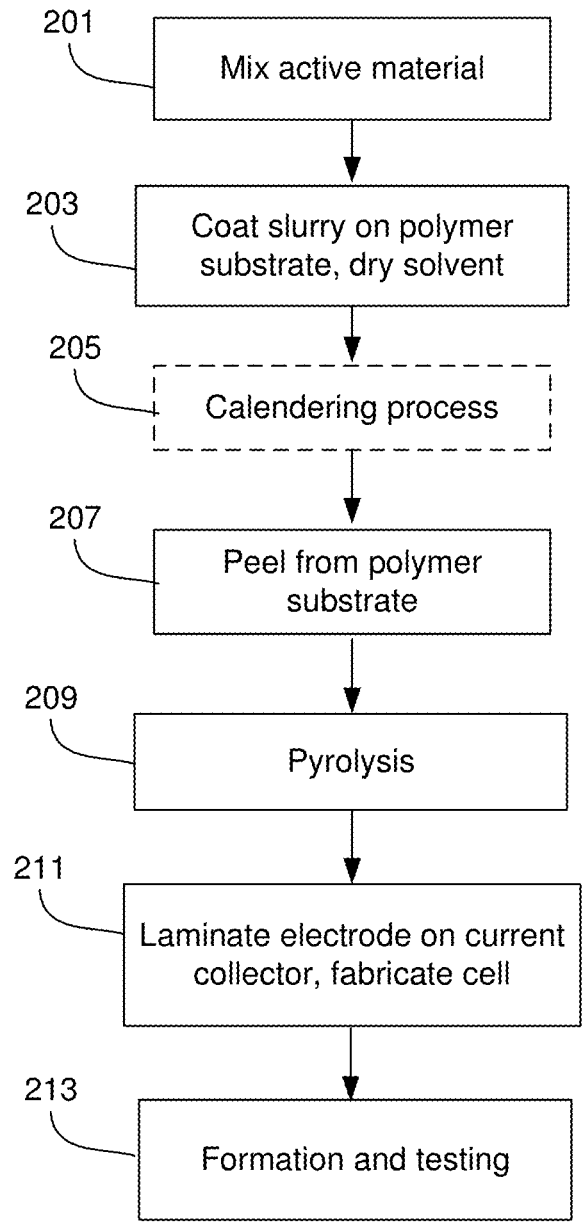
FIG. 2A is a flow diagram of a lamination process for forming a silicon-dominant anode cell, in accordance with an example embodiment of the disclosure.

FIG. 2A is a flow diagram of a lamination process for forming a silicon-dominant anode cell, in accordance with an example embodiment of the disclosure. This process employs a high-temperature pyrolysis process on a substrate, layer removal, and a lamination process to adhere the active material layer to a current collector.

The raw electrode active material is mixed in step 201. In the mixing process, the active material may be mixed, e.g., a binder/resin (such as PI, PAI), solvent, and conductive additives. The materials may comprise carbon nanotubes/fibers, graphene sheets, metal polymers, metals, semiconductors, and/or metal oxides, for example. Silicon powder with a 1-30 or 5-30 μm particle size, for example, may then be dispersed in polyamic acid resin (15% solids in N-Methyl pyrrolidone (NMP)) at, e.g., 1000 rpm for, e.g., 10 minutes, and then the conjugated carbon/NMP slurry may be added and dispersed at, e.g., 2000 rpm for, e.g., 10 minutes to achieve a slurry viscosity within 2000-4000 cP and a total solid content of about 30%.

In step 203, the slurry may be coated on a substrate. In this step, the slurry may be coated onto a Polyester, polyethylene terephthalate (PET), or Mylar film at a loading of, e.g., 2-4 mg/cm$^2$ and then undergo drying to an anode coupon with high Si content and less than 15% residual solvent content. This may be followed by an optional calendering process in step 205, where a series of hard pressure rollers may be used to finish the film/substrate into a smoothed and denser sheet of material.

In step 207, the green film may then be removed from the PET, where the active material may be peeled off the polymer substrate, the peeling process being optional for a polypropylene (PP) substrate, since PP can leave ~2% char residue upon pyrolysis. The peeling may be followed by a pyrolysis step 209 where the material may be heated to 600-1250 C for 1-3 hours, cut into sheets, and vacuum dried using a two-stage process (120° C. for 15 h, 220° C. for 5 h).

In step 211, the electrode material may be laminated on a current collector. For example, a 5-20 μm thick copper foil may be coated with polyamide-imide with a nominal loading of, e.g., 0.2-0.6 mg/cm$^2$ (applied as a 6 wt % varnish in NMP and dried for, e.g., 12-18 hours at, e.g., 110° C. under vacuum). The anode coupon may then be laminated on this adhesive-coated current collector. In an example scenario, the silicon-carbon composite film is laminated to the coated copper using a heated hydraulic press. An example lamination press process comprises 30-70 seconds at 300° C. and 3000-5000 psi, thereby forming the finished silicon-composite electrode.

The electrodes may be stacked with one or more separators between electrodes, and strain absorbing material comprising a foam or other springy material may be incorporated when incorporating the stack in a can, such as a cylindrical or prismatic can. Extra layers of separator may purposely be introduced, for example, by winding extra layers of separator outside of the stack.

In step 213, the cell may be assessed before being subject to a formation process. The measurements may comprise impedance values, open circuit voltage, and thickness measurements. During formation, the initial lithiation of the anode may be performed, followed by delithiation. Cells may be clamped during formation and/or early cycling. The formation cycles are defined as any type of charge/discharge of the cell that is performed to prepare the cell for general cycling and is considered part of the cell production process. Different rates of charge and discharge may be utilized in formation steps and the known expansion along with the strain absorbing material within the can may enable a desired pressure on the electrodes during formation, leading to increased performance and cell life, and may also be beneficial for pack design with can cells.

Figure 2B:
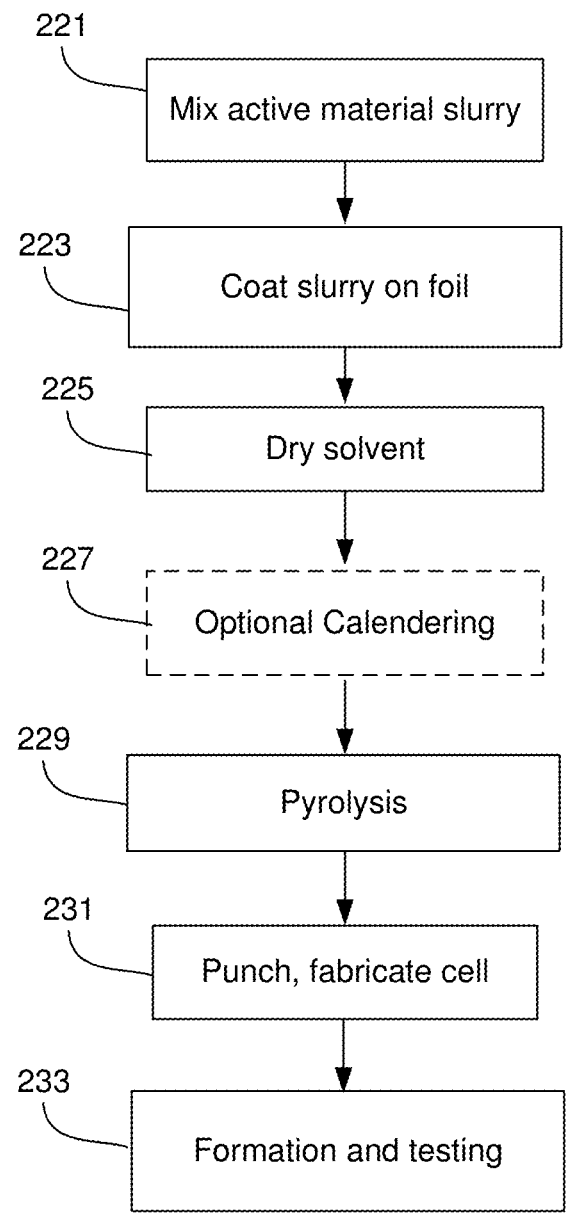
FIG. 2B is a flow diagram of a direct coating process for forming a silicon-dominant anode cell, in accordance with an example embodiment of the disclosure.

FIG. 2B is a flow diagram of a direct coating process for forming a silicon-dominant anode cell, in accordance with an example embodiment of the disclosure. This process comprises physically mixing the active material, conductive additive, and binder together, and coating it directly on a current collector before pyrolysis. This example process comprises a direct coating process in which an anode or cathode slurry is directly coated on a copper foil using a binder such as CMC, SBR, Sodium Alginate, PAI, PI and mixtures and combinations thereof.

In step 221, the active material may be mixed, e.g., a binder/resin (such as PI, PAI), solvent, and conductive additives. The materials may comprise carbon nanotubes/fibers, graphene sheets, metal polymers, metals, semiconductors, and/or metal oxides, for example. Silicon powder with a 5-30 μm particle size, for example, may then be dispersed in polyamic acid resin (15% solids in N-Methyl pyrrolidone (NMP)) at, e.g., 1000 rpm for, e.g., 10 minutes, and then the conjugated carbon/NMP slurry may be added and dispersed at, e.g., 2000 rpm for, e.g., 10 minutes to achieve a slurry viscosity within 2000-4000 cP and a total solid content of about 30%.

Furthermore, cathode active materials may be mixed in step 221, where the active material may comprise lithium cobalt oxide (LCO), lithium iron phosphate, lithium nickel cobalt manganese oxide (NMC), lithium nickel cobalt aluminum oxide (NCA), lithium manganese oxide (LMO), lithium nickel manganese spinel, or similar materials or combinations thereof, mixed with a binder as described above for the anode active material.

In step 223, the slurry may be coated on a copper foil. In the direct coating process described here, an anode slurry is coated on a current collector with residual solvent followed by a calendaring process for densification followed by pyrolysis (~500-800 C) such that carbon precursors are partially or completely converted into glassy carbon. Similarly, cathode active materials may be coated on a foil material, such as aluminum, for example. The active material layer may undergo a drying in step 225 resulting in reduced residual solvent content. An optional calendering process may be utilized in step 227 where a series of hard pressure rollers may be used to finish the film/substrate into a smoother and denser sheet of material. In step 227, the foil and coating proceeds through a roll press for lamination.

In step 229, the active material may be pyrolyzed by heating to 500-1000° C. such that carbon precursors are partially or completely converted into glassy carbon. Pyrolysis can be done either in roll form or after punching. If done in roll form, the punching is done after the pyrolysis process. The pyrolysis step may result in an anode active material having silicon content greater than or equal to 50% by weight, where the anode has been subjected to heating at or above 400 degrees Celsius. In an example scenario, the anode active material layer may comprise 20 to 95% silicon and in yet another example scenario may comprise 50 to 95% silicon by weight. In instances where the current collector foil is not pre-punched/pre-perforated, the formed electrode may be perforated with a punching roller, for example. The electrodes may then be sandwiched with a separator and electrolyte to form a cell. The electrodes may be stacked with one or more separators between electrodes, and strain absorbing material comprising a foam or other springy material may be incorporated when incorporating the stack in a can, such as a cylindrical or prismatic can. Extra layers of separator may purposely be introduced, for example, by winding extra layers of separator outside of the stack.

In step 233, the cell may be assessed before being subject to a formation process. The measurements may comprise impedance values, open circuit voltage, and thickness measurements. During formation, the initial lithiation of the anode may be performed, followed by delithiation. Cells may be clamped during formation and/or early cycling. The formation cycles are defined as any type of charge/discharge of the cell that is performed to prepare the cell for general cycling and is considered part of the cell production process. Different rates of charge and discharge may be utilized in formation steps and the known expansion along with the strain absorbing material within may enable a desired pressure or pressure range on the electrodes during formation, leading to increased performance and cell life.

Figure 3:
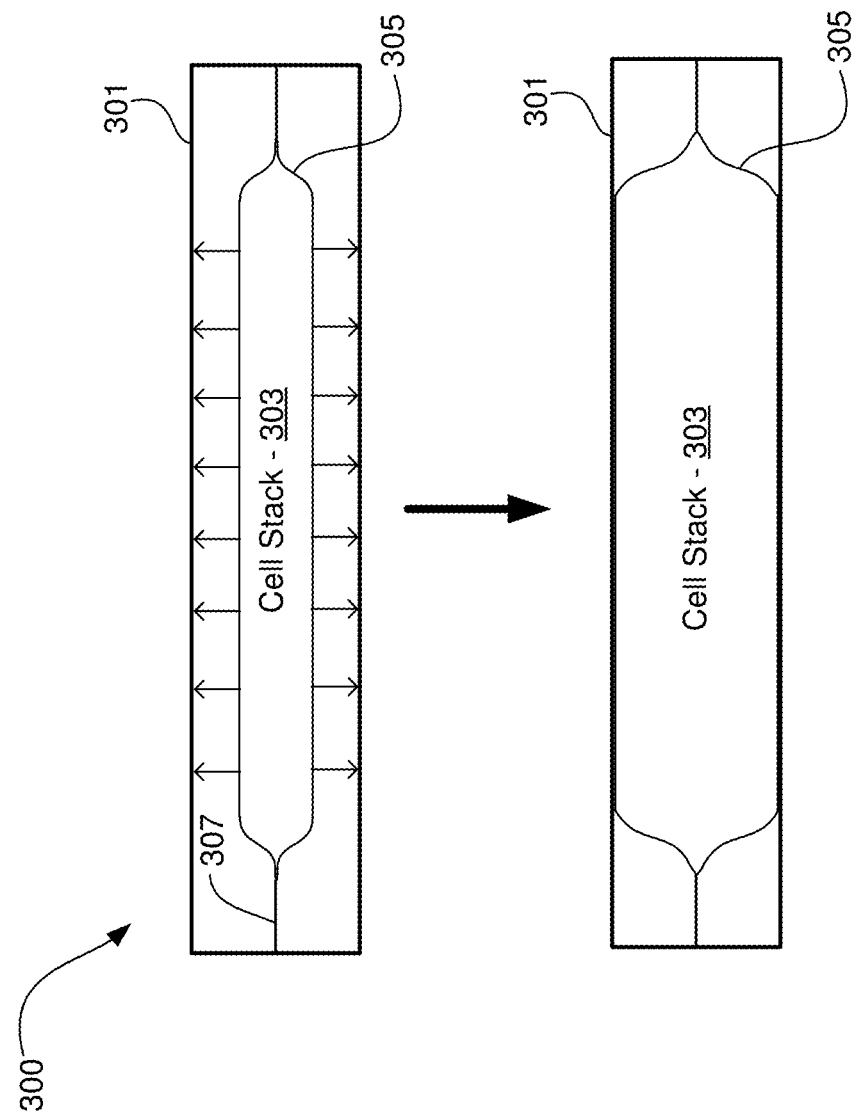
FIG. 3 illustrates example cell stack expansion during operation, in accordance with an example embodiment of the disclosure

FIG. 3 illustrates example cell stack expansion during operation, in accordance with an example embodiment of the disclosure. Referring to FIG. 3, there is shown can cell 300 comprising can 301, cell stack 303, cell pouch 305, and terminals 307. The can 301 may comprise a metal container, for example, that provides structural rigidity as well as protection from the external environment such as air and moisture. In this example, the can 301 comprises a prismatic shape, such as a rectangular shape, although may instead comprise a cylindrical or other shape in some embodiments.

The cell stack 303 comprises one or more sets of anode/separator/cathode stacked within an electrolyte to form a cell, where the number of stacks may be configured based on desired cell output or cycle capacity, for example. In an example scenario, the cell stack 303 may also be enclosed in a cell pouch 305, which may provide further environmental isolation for the cell stack 303 and its electrolyte. The cell pouch 305 may comprise a plastic material and may have terminals 307 comprising metal tabs, for example, extending from the cell pouch 305 that provide electrical contact to the cell stack 303, one being electrically coupled to the anode(s) and the other to the cathode(s). In some embodiments, the cell pouch 305 is optional, such as in instances where the can 301 provides adequate protection from the environment. The terminals 307 provide electrical connection to terminals outside the can 301.

As shown by the two views in FIG. 3, the cell stack 303 expands due to the lithiation of the anode during charging, for example. The upper view shows the cell stack 303 before lithiation and the lower view shows the cell stack 303 after lithiation. As described above, the charging of silicon-dominant anodes causes physical expansion of the electrodes due to lithiation of the silicon, which can result in pressure on the cell stack 303 if the dimensions of the can 301 are less than the final thickness, without restraint, of the cell stack 303.

If the expansion of the cell is too high or too low, the cell performance may be non-optimal. Therefore, it is desirable to provide a strain absorbing material of a desired thickness and springiness to provide a desired pressure on the stack as well as evening out the pressure so that pressure is more uniform during the formation process, as well as during regular cycling. This is shown further with respect to FIGS. 4-7.

Figure 4:
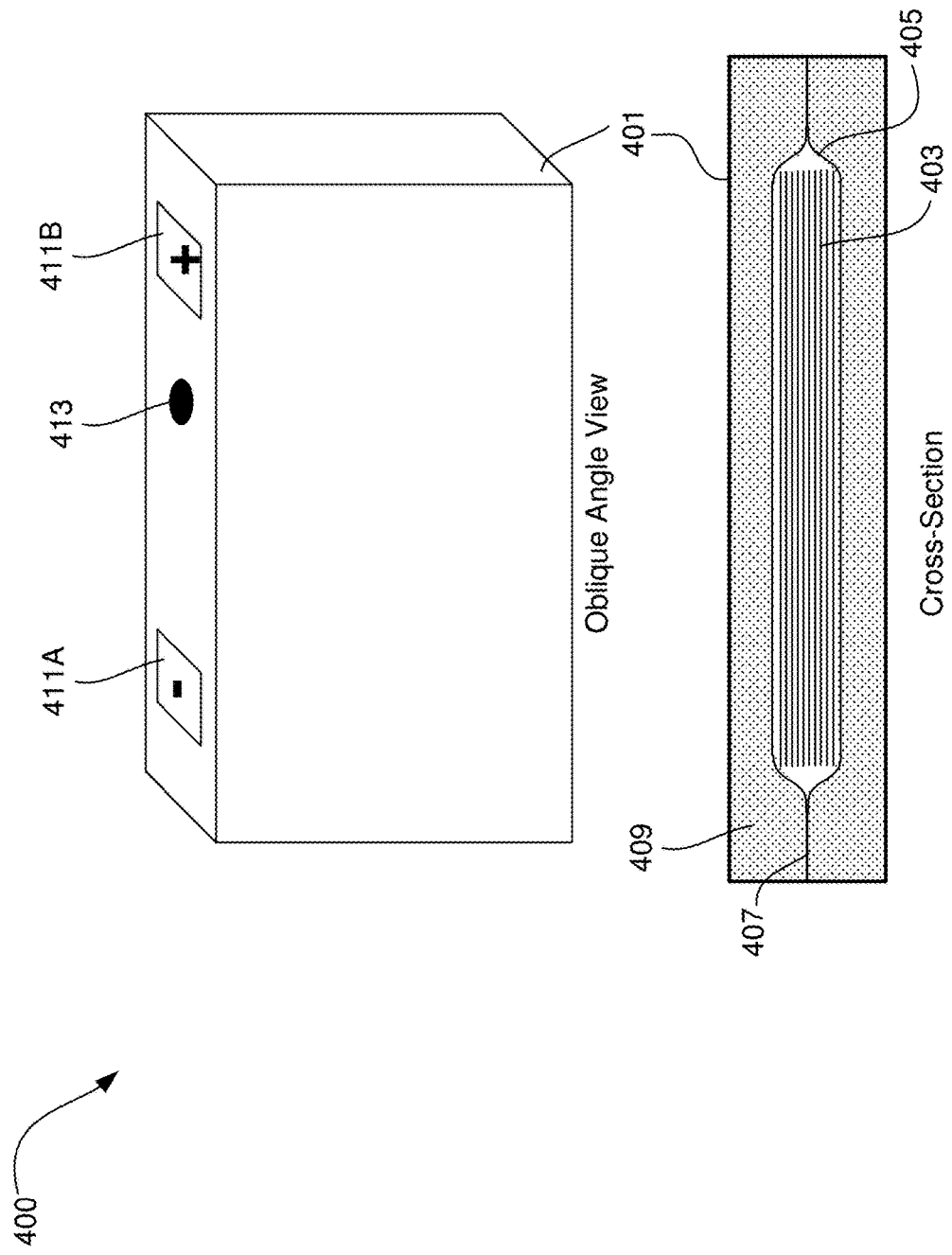
FIG. 4 illustrates a can cell with strain absorbing material, in accordance with an example embodiment of the disclosure.

FIG. 4 illustrates a can cell with strain absorbing material, in accordance with an example embodiment of the disclosure. Referring to FIG. 4, there is shown can cell 400 comprising can 401, cell stack 403, cell stack pouch 405, terminals 407, strain absorbing material 409, external terminals 411A and 411B, and electrolyte fill hole 413.

The can 401, cell stack 403, cell stack pouch 405, and terminals 407 may be similar to similar elements described with respect to FIGS. 1-3. The lines shown in the cell stack 403 represent the stacked anodes, cathodes, and separators within an electrolyte. The terminals 407 provide electrical connection to external terminals 411A and 411B on the outside surface of the can 401. While a prismatic can is shown in FIG. 4, a cylindrical or other shaped can may be utilized in accordance with the present disclosure. The strain absorbing material 409 may comprise a foam, open or closed cell, for example, or other elastic material that may be operable to absorb strain from the expanding cells stack 403 during lithiation, and provide a desired resistive pressure against the expansion of the cell stack 403. In another example embodiment, the strain absorbing material 409 may comprise a gel polymer electrolyte, in which case the cell stack pouch 405 would not be needed.

In yet another example, the strain absorbing material 409 comprises a solid state or semi-solid state electrolyte, such as gel-polymer electrolytes. The electrolyte may be a polymer or polymer gel type electrolyte, which includes solid polymer and gel polymer electrolytes (GPE) where a gelling agent is added to a liquid electrolyte. GPEs consist of liquid electrolyte absorbed within a polymer matrix. Examples of polymer matrix are poly(vinylidene difluoride) (PVdF), poly (ethylene oxide) (PEO), poly(methyl methacrylate) (PMMA), polyvinyl chloride (PVC), and poly-(vinylidene fluoride-hexafluoropropylene). Polymer groups such as (but not limited to) polyacrylate, polynitrile, polyether, polycarbonate polyvinyl can be considered as other polymer hosts for GPEs.

Inorganic solid electrolytes (ISE), solid polymer electrolytes (SPE), and composite electrolytes (CSE) can also be employed. SPEs with inert oxide ceramic as fillers such as $SiO_2$, $Al_2O_3$, $TiO_2$, zeolite are some examples that can been incorporated into a polymer. Garnet-type $(A_3B_2(XO_4)_3$ (A=Ca, Mg, Y, La or rare-earth elements; B=Al, Fe, Ga, Ge, Mn, Ni, or V), Perovskite-type solid electrolytes, NASICON-type and LISICON-type SPEs can also be introduced as fast ionic conductors.

In instances where the electrolyte is a liquid and there is no cell pouch 405, the electrolyte may be incorporated into the can 401 via the electrolyte fill hole 413, which is subsequently sealed. In yet another example, the strain absorbing material 409 may comprise a leaf spring mechanism between the cell stack 403 and the walls of the can 401 for absorbing strain/applying pressure on the cell stack 403. In yet another example, the strain absorbing material 409 can be powder or a powder suspension of inert material such as silica, alumina, or zirconia.

In silicon anode can cells, the can may bulge out during the formation process and/or when cycling. To counter that, pressure may be applied to the can or it may be placed in a constant gap setup. During formation, the applied pressure or constant gap setup may prevent bulging, such that even after the added pressure is removed or the can is removed from the setup, the cell does not bulge in subsequent cycles. In an example with large amounts of expansion, on the order of 10-20%, when the cells tack is placed in the can and subjected to a formation process, there may not be adequate pressure if enough space is left to allow expansion. In this case, springy material, such as the strain absorbing material 409, may be incorporated in the can 401. In an example scenario, a physically robust foam may be utilized that is also chemically robust to the electrolyte.

Another option is to utilize multiple separators with some amount of elasticity, increasing the thickness such that the pressure applied during formation is configured at a desired level for increased cell performance and cell life. Some example materials for the strain absorbing material in gel form are polymethyl methacrylate (PMMA), polyvinylidene fluoride (PVDF), etc. Some examples may comprise polymer matrix such as poly(vinylidene difluoride) (PVdF), poly(ethylene oxide) (PEO), poly(methyl methacrylate) (PMMA), polyvinyl chloride (PVC), and poly-(vinylidene fluoride-hexafluoropropylene). Polymer groups but not limited to polyacrylate, polynitrile, polyether, polycarbonate polyvinyl can be considered as the polymer hosts for GPE. Different rates of charge and discharge may be utilized in formation steps and the known expansion of the cell stack 403 along with the strain absorbing materials 409 within the can 401 may enable a desired pressure on the electrodes during formation, leading to increased performance and cell life.

Figure 5A:
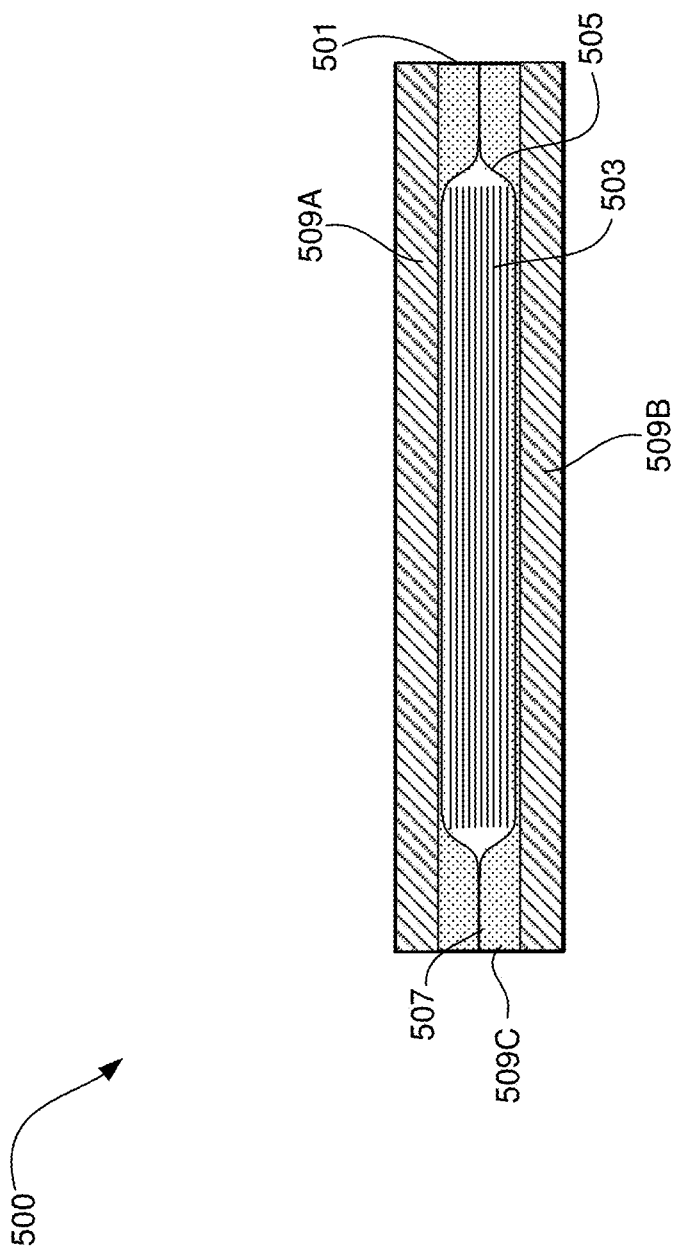
FIG. 5A illustrates a prismatic can cell with a single electrode stack and internal absorbing layers, in accordance with an example embodiment of the disclosure.

FIG. 5A illustrates a prismatic can cell with a single electrode stack an internal absorbing layers, in accordance with an embodiment of the disclosure. Referring to FIG. 5, there is shown a prismatic can cell 500 comprising can 501, cell stack 503, cell pouch 505, terminals 507, and strain absorbing materials 509A-509C. The can 501, cell stack 503, cell stack pouch 505, and terminals 507 may be similar to similar elements described with respect to FIGS. 1-4.

The strain absorbing materials 509A and 509B may comprise foam pads, excess separator, or other springy materials incorporated within the can 501 and may be of a certain thickness and rigidity to provide a desired pressure when the cell stack 503 expands upon lithiation during formation. The absorbing material 509C may comprise a gel surrounding the cell stack 503, and may be the same or different than the strain absorbing materials 509A and 509B. These gels may comprise polymers that contain polyacrylate, polynitrile, polyether, polycarbonate, polyvinyl, that may be considered as the polymer hosts for GPE, which can trap Li conducting organic solvent (electrolyte).

The use of the strain absorbing materials 509A and 509B between cell stacks, such as cell stack 503, and the can 501, distributes the cell pressure evenly across the cell. The pressure on the cells may range between 10 kPa and 1 MPa, 50 kPa and 500 kPa, 50 kPa and 300 kPa. The relationship between deformation of the elastic material (displacement) and pressure may be nonlinear and different for each foam, as illustrated in FIG. 5B.

The strain absorbing material 509A and 509B may be electrochemically and chemically inactive with the electrolyte and other cell components. Different rates of charge and discharge may be utilized in formation steps and the known expansion of the cell stack 503 along with the strain absorbing materials 509A and 509B within the can 501 may enable a desired pressure on the electrodes during formation, leading to increased performance and cell life.

Figure 5B:
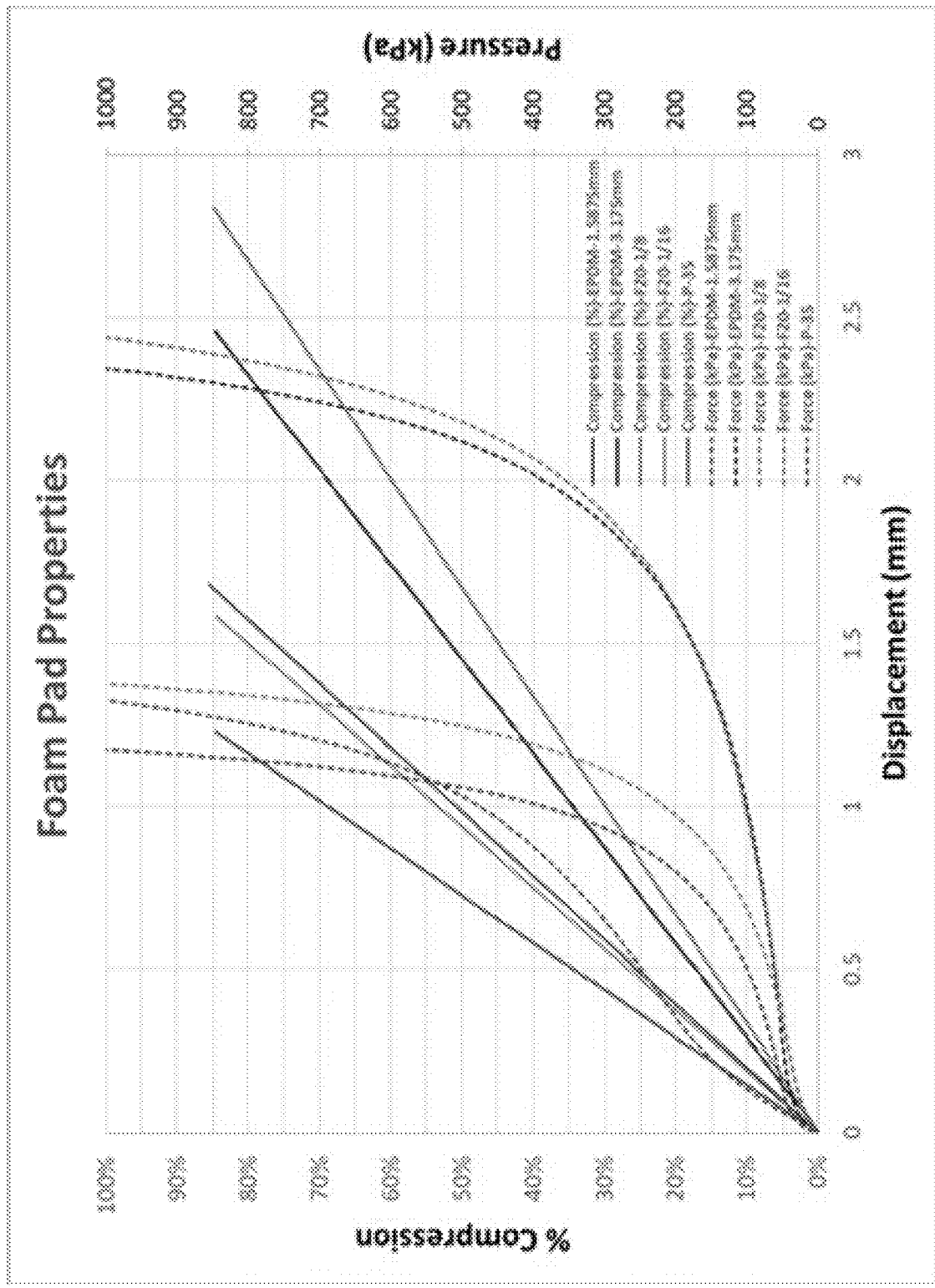
FIG. 5B illustrates foam pad properties, in accordance with an example embodiment of the disclosure.

FIG. 5B illustrates foam pad properties, in accordance with an example embodiment of the disclosure. Referring to FIR. 5B, there is shown foam pad compression versus displacement and pressure versus displacement for various foams and thicknesses, where the solid lines represent compression and the dashed lines represent force (pressure). As can be seen from the plots, while the compression is linear with displacement, the pressure is not linear with displacement.

Figure 6:
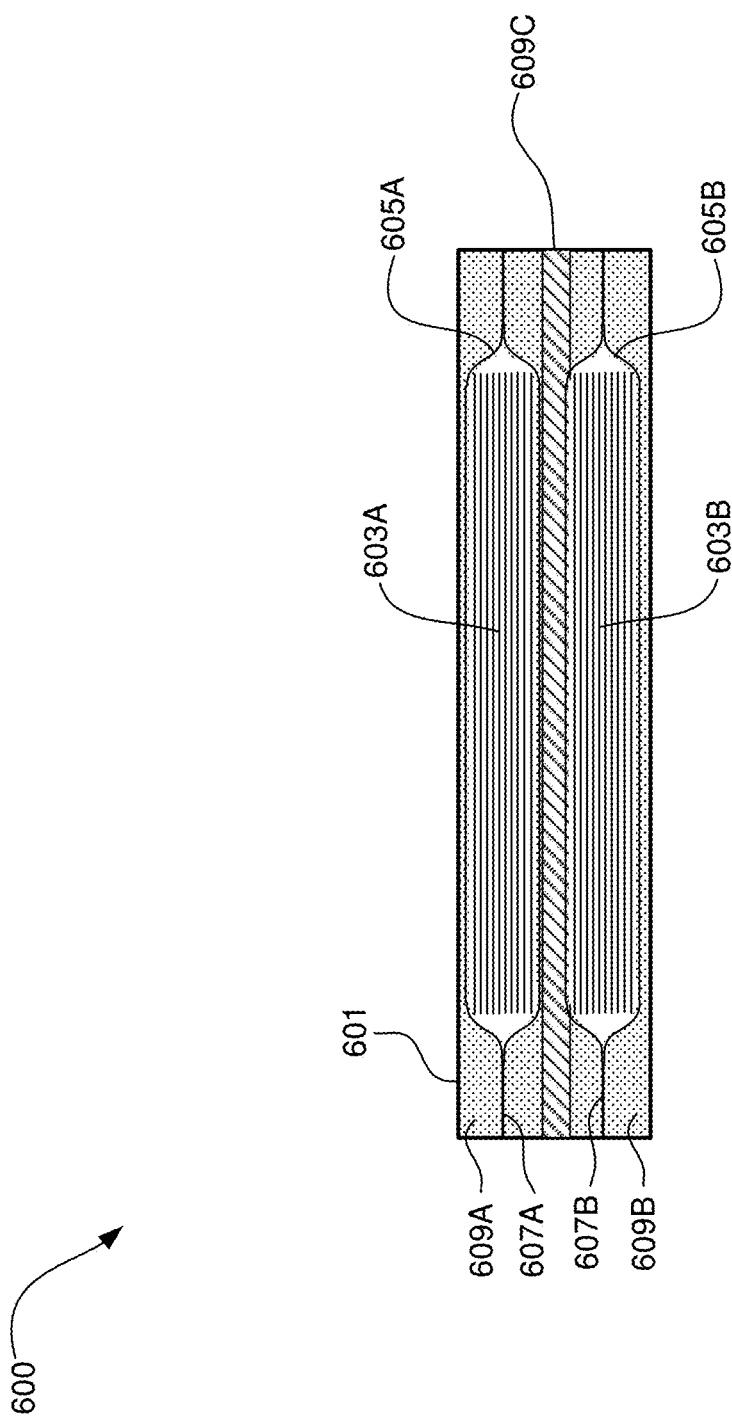
FIG. 6 illustrates a prismatic can cell with multiple electrode stacks and internal absorbing layers, in accordance with an example embodiment of the disclosure.

FIG. 6 illustrates a prismatic can cell with multiple electrode stacks and internal absorbing layers, in accordance with an embodiment of the disclosure. Referring to FIG. 6, there is shown a prismatic can cell 600 comprising can 601, cell stacks 603A and 603B, cell pouches 605A and 605B, terminals 607A and 607B, and strain absorbing materials 609A-609C. The can 601, cell stacks 603A and 603B, cell stack pouches 605A and 605B, and terminals 607A and 607B may be similar to similar elements described with respect to FIGS. 1-5. While a prismatic can cell is shown, a cylindrical or other shape can is possible in accordance with the present disclosure.

The strain absorbing materials 609A-609C may comprise gels, foam pads, excess separator layer or layers, inert particle suspensions, or other springy or elastic materials incorporated within the can 601 and may be of a certain thickness and rigidity to provide a desired pressure when the cell stacks 603A and 603B expand upon lithiation during formation or operation. Example gel materials comprise polymers that contain polyacrylate, polynitrile, polyether, polycarbonate polyvinyl can be considered as the polymer hosts for GPE, which can trap Li conducting organic solvent (electrolyte). The strain absorbing material 609C may be the same or different than the strain absorbing materials 609A and 609B. In one example, the absorbing materials 609A and 609B comprise a gel mostly surrounding the cell stacks 603A and 603B, while the absorbing material 609C comprises a foam layer between the cell stacks 603A and 603B.

The strain absorbing materials 609A-609C may comprise electrolyte, which may be a polymer or polymer gel type electrolyte, which includes solid polymer and gel polymer electrolytes (GPE) where a gelling agent is added to a liquid electrolyte. GPEs consist of liquid electrolyte absorbed within a polymer matrix. Examples of polymer matrix are poly(vinylidene difluoride) (PVdF), poly(ethylene oxide) (PEO), poly(methyl methacrylate) (PMMA), polyvinyl chloride (PVC), and poly-(vinylidene fluoride-hexafluoropropylene). Polymer groups such as (but not limited to) polyacrylate, polynitrile, polyether, polycarbonate polyvinyl can be considered as other polymer hosts for GPEs. In yet another example, the strain absorbing material 609A-609C can be powder or a powder suspension of inert material such as silica, alumina, or zirconia.

The absorbing materials 609A-609C may enable pressures ranging from 10 kPa to 1 MPa, 50 kPa to 500 kPa, and 50 kPa to 300 kPa. Different rates of charge and discharge may be utilized in formation steps and the known expansion of the cell stacks 603A and 603B along with the strain absorbing material 605A-605C within the can may enable a desired pressure on the electrodes during formation, leading to increased performance and cell life. Materials used in 609A-609C and 605A-605C may or may not be the same pressure absorbing material.

Figure 7:
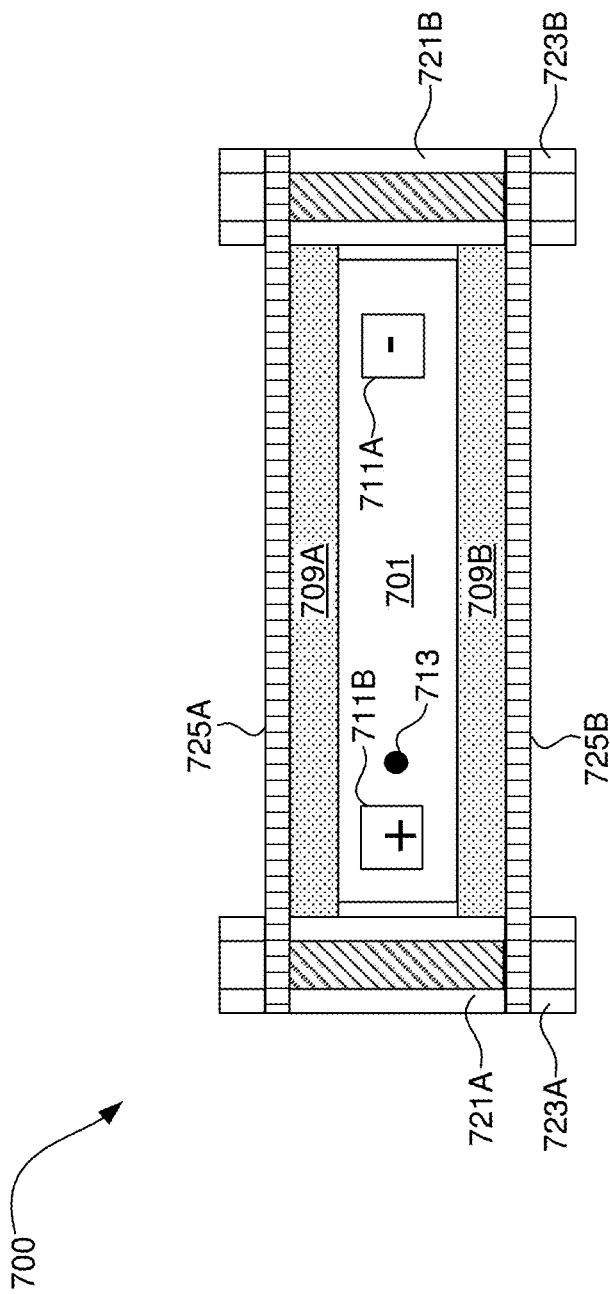
FIG. 7 illustrates a can cell formation pressure apparatus, in accordance with an example embodiment of the disclosure.

FIG. 7 illustrates a can cell formation pressure apparatus, in accordance with an example embodiment of the disclosure. Referring to FIG. 7, there is shown formation pressure apparatus 700 applying pressure to can 701, the apparatus comprising top and bottom pressure plates 725A and 725B, spacers 721A and 721B, strain absorbing materials 709A and 709B, and bolts 723A and 723B. The can 701 comprises terminals 711A and 711B and electrolyte fill hole 713, although other terminal and fill hole placements are possible, depending on the application.

The spacers 721A and 721B may be configured to provide a fixed spacing between the top and bottom plates 725A and 725B, where the can 701 is placed within with the strain absorbing materials 709A and 709B, so that a desired range of pressure is applied to the can 701 as uniformly as possible during the formation process. The absorbing materials 709A and 709B may be in addition to absorbing materials within the can 701, and may comprise polymer matrix such as poly(vinylidene difluoride) (PVdF), poly(ethylene oxide) (PEO), poly(methyl methacrylate) (PMMA), polyvinyl chloride (PVC), and poly-(vinylidene fluoride-hexafluoropropylene). Polymer groups such as (but not limited to) polyacrylate, polynitrile, polyether, polycarbonate polyvinyl can be considered as other polymer hosts for GPEs. In yet another example, the strain absorbing material 609A-609C may be powder or a powder suspension of inert material such as silica, alumina, or zirconia.

The absorbing materials 709A and 709 may provide pressures ranging from 10 kPa to 1 MPa, 50 kPa to 500 kPa, and 50 kPa to 300 kPa. Different rates of charge and discharge may be utilized in formation steps and the known expansion of the cell stack along with the strain absorbing material within the can 701 and the strain absorbing materials 709A and 709B external to the can 701 may enable a desired pressure on the electrodes during formation, leading to increased performance and cell life.

In an example embodiment of the disclosure, a method and system is described for formation of cylindrical and prismatic can cells, and may include providing a battery comprising: one or more cells, each cell comprising at least one silicon-dominant anode, a cathode, and a separator; and a metal can that contains the one or more cells such that during formation a pressure between 50 kPa and 1 MPa is applied to the one or more cells. One or more strain absorbing materials may be arranged between the one or more cells and interior walls of the can. The strain absorbing materials may comprise foam. The strain absorbing materials may comprise a solid electrolyte layer.

The strain absorbing materials may comprise The strain absorbing materials may comprise some sort of foam, excess separator, PMMA, PVDF, or a combination thereof. The strain absorbing materials may comprise powder or a powder suspension of inert material such as silica, alumina, or zirconia. A pressure may be applied to the one or more cells during a formation process due to a thickness of the strain absorbing materials being thicker than an expansion of the one or more cells during lithiation of the at least one silicon-dominant anode. The battery may comprise two or more cells and a first absorbing material is between one of the two or more cells and an interior wall of the can and a second absorbing material is between two of the two or more cells. The first absorbing material may be a different material than the second absorbing material or may be a same material as the second absorbing material. One or more strain absorbing materials may be placed outside the can during the formation process. The formation process may comprise one or more charge and discharge cycles with currents greater than 1C.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A battery, the battery comprising:
   one or more cells, each cell comprising at least one silicon-dominant anode, a cathode, and a separator;
   a structurally rigid metal can that contains the one or more cells; and
   strain absorbing materials between the one or more cells and the structurally rigid metal can or between the one or more cells, such that during cycling a pressure between 50 kPa and 1 MPa is applied to the one or more cells based on compression of strain absorbing materials between the structurally rigid metal can and the one or more cells or between the one or more cells caused by displacement of the strain absorbing materials from expansion of the one or more cells.

2. The battery of claim 1, wherein the strain absorbing materials are incorporated between the one or more cells and interior walls of the can.

3. The battery of claim 1, wherein the strain absorbing materials comprise foam or springy material that distributes the pressure uniformly along the one or more cells.

4. The battery of claim 1, wherein the strain absorbing materials comprise a solid electrolyte layer.

5. The battery of claim 1, wherein the strain absorbing materials comprise poly(methyl methacrylate) (PMMA), poly(vinylidene difluoride) (PVDF), or a combination thereof.

6. The battery of claim 1, wherein the strain absorbing materials comprise powder or a powder suspension of inert material including one or more of silica, alumina, or zirconia.

7. The battery of claim 1, wherein pressure applied to the one or more cells during cycling is due to a thickness of the strain absorbing materials being thicker than an expansion of the one or more cells during lithiation of the at least one silicon-dominant anode.

8. The battery of claim 7, comprising placing one or more strain absorbing materials outside the can during cycling.

9. The battery of claim 7, wherein cycling comprises one or more charge and discharge cycles with currents greater than 1C.

10. The battery of claim 1, wherein the battery comprises two or more cells and a first absorbing material is between one of the two or more cells and an interior wall of the can and a second absorbing material is between two of the two or more cells.

11. The battery of claim 10, wherein the first absorbing material is a different material than the second absorbing material.

12. The battery of claim 10, wherein the first absorbing material is a same material as the second absorbing material.

13. The battery of claim 1, wherein each cell of the one or more cells comprises at least one silicon-dominant anode including at least 50% silicon by weight.

14. A battery, the battery comprising:
   one or more cells, each cell comprising at least one silicon-dominant anode, a cathode, and a separator;
   a metal can that contains the one or more cells;
   a first strain absorbing material surrounding the one or more cells; and
   a second strain absorbing material surrounding the first strain absorbing material, such that during formation a pressure between 50 kPa and 1 MPa is applied to the one or more cells.

15. The battery of claim 14, wherein the first or second strain absorbing materials comprise foam or springy material that distributes the pressure uniformly along the surface.

16. The battery of claim 14, wherein the first or second strain absorbing materials comprise a solid electrolyte layer.

17. The battery of claim 14, wherein the first or second strain absorbing materials comprise poly(methyl methacrylate) (PMMA), poly(vinylidene difluoride) (PVDF), or a combination thereof.

18. The battery of claim 14, wherein the first or second strain absorbing materials comprise powder or a powder suspension of inert material including silica, alumina, or zirconia.

19. The battery of claim 14, wherein the battery comprises two or more cells and the first strain absorbing material is between one of the two or more cells and an interior wall of the can and the second absorbing material is between two of the two or more cells.

20. The battery of claim 14, wherein the first absorbing material is a different material than the second absorbing material.

21. The battery of claim 14, wherein pressure applied to the one or more cells during a formation process is due to a thickness of the first or second strain absorbing materials being thicker than an expansion of the one or more cells during lithiation of the at least one silicon-dominant anode.

22. The battery of claim 21, comprising placing one or more strain absorbing materials outside the can during the formation process.

23. The battery of claim 21, wherein the formation process comprises one or more charge and discharge cycles with currents greater than 1C.

24. The battery of claim 14, wherein each cell of the one or more cells comprises at least one silicon-dominant anode including at least 50% silicon by weight.

* * * * *